(12) United States Patent
Hashimoto et al.

(10) Patent No.: US 10,050,500 B2
(45) Date of Patent: Aug. 14, 2018

(54) COIL END SHAPING APPARATUS

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Shingo Hashimoto, Okazaki (JP); Katsuya Ito, Nagoya (JP); Takanori Ota, Anjo (JP); Norihiko Akao, Nisshin (JP); Hirotaka Kawaura, Toyota (JP); Hisayuki Kobayashi, Toyota (JP); Hiroharu Sugiura, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 157 days.

(21) Appl. No.: 15/035,529

(22) PCT Filed: Dec. 5, 2014

(86) PCT No.: PCT/JP2014/082265
§ 371 (c)(1),
(2) Date: May 10, 2016

(87) PCT Pub. No.: WO2015/083827
PCT Pub. Date: Jun. 11, 2015

(65) Prior Publication Data
US 2016/0294263 A1    Oct. 6, 2016

(30) Foreign Application Priority Data

Dec. 5, 2013   (JP) ................................ 2013-252000

(51) Int. Cl.
*B23P 19/00* (2006.01)
*H02K 15/04* (2006.01)
(Continued)

(52) U.S. Cl.
CPC ............ *H02K 15/045* (2013.01); *H01F 5/04* (2013.01); *H01F 41/10* (2013.01);
(Continued)

(58) Field of Classification Search
CPC ............. H02K 15/0087; H02K 15/045; Y10T 29/49009; Y10T 29/53161;
(Continued)

(56) References Cited

U.S. PATENT DOCUMENTS 7,647,689 B2 *   1/2010   Nishimura ......... H02K 15/0478
                                                                29/596
8,427,024 B2 *   4/2013   Watanabe ................ H02K 3/12
                                                                310/179
(Continued)

FOREIGN PATENT DOCUMENTS

CN     101860143 A     10/2010
JP     H06-261505 A    9/1994
(Continued)

OTHER PUBLICATIONS

Dec. 8, 2016 Search Report issued in European Patent Application No. 14867301.5.
(Continued)

*Primary Examiner* — Thiem Phan
(74) *Attorney, Agent, or Firm* — Oliff PLC

(57) ABSTRACT

A coil end shaping apparatus shapes three flatwise bent portions f1 to f3 in a lead wire portion extending from one end of a coil by bringing first and second shaping dies close to each other such that one of the flatwise bent portions is bent in the direction that is opposite to the direction in which the rest are bent. The second shaping die, which is a movable die, has an clearance portion that prevents a portion of the lead wire portion to be bent along the flatwise direction on the side closest to the free end from being restrained by not (Continued)

contacting the lead wire portion while the flatwise bent portions on the base end side with respect to the flatwise bent portion on the side closest to the free end, of the three flatwise bent portions, are shaped in the lead wire portion.

9 Claims, 13 Drawing Sheets

(51) Int. Cl.
*H01F 5/04* (2006.01)
*H02K 15/00* (2006.01)
*H01F 41/10* (2006.01)
*H02K 3/52* (2006.01)

(52) U.S. Cl.
CPC ......... *H02K 15/0056* (2013.01); *H02K 3/522* (2013.01); *H02K 15/0062* (2013.01); *Y10T 29/53161* (2015.01)

(58) Field of Classification Search
CPC ......... Y10T 29/49071; Y10T 29/53122; Y10T 29/5137; B21F 35/02; B21F 45/00
USPC ......... 29/736, 596, 598, 605, 606, 732, 760, 29/761
See application file for complete search history.

(56) References Cited

U.S. PATENT DOCUMENTS

| | | |
|---|---|---|
| 2003/0173842 A1 | 9/2003 | Kobayashi et al. |
| 2010/0252139 A1 | 10/2010 | Akimoto et al. |

FOREIGN PATENT DOCUMENTS

| | | |
|---|---|---|
| JP | 2002-064028 A | 2/2002 |
| JP | 2005-080488 A | 3/2005 |
| JP | 2010-110122 A | 5/2010 |
| WO | 2014/017125 A1 | 1/2014 |

OTHER PUBLICATIONS

Feb. 24, 2015 International Search Report issued in International Patent Application No. PCT/JP2014/082265.

* cited by examiner

COIL END SHAPING APPARATUS

TECHNICAL FIELD

Aspects of preferred embodiments relate to a coil end shaping apparatus and a coil end shaping method that shape at least two first bent portions that are bent along a first bend direction in a lead wire portion that extends from one end of a coil.

BACKGROUND ART

Hitherto, there has been known a coil that constitutes a stator of a rotary electric machine. The coil is formed by winding a wire material (rectangular wire) with a rectangular cross section and having a crossover wire (lead wire portion) provided at one end (see Patent Document 1, for example). The coil is mounted to a stator core via an insulating member. In addition, the crossover wire of the coil has two flatwise bent portions that are bent in the flatwise direction (direction that is generally orthogonal to the long side of the cross section), and an end portion of the crossover wire is electrically connected to an end portion of another corresponding coil on the side opposite to a crossover wire.

RELATED-ART DOCUMENTS

Patent Documents

[Patent Document 1] Japanese Patent Application Publication No. 2010-110122 (JP 2010-110122 A)

SUMMARY

In the coil of the rotary electric machine described in Patent Document 1, the two flatwise bent portions of the lead wire portion are bent in the same direction. In order to achieve a size reduction of the rotary electric machine and to suppress interference between lead wire portions (crossover wires), it may be necessary to form two or more flatwise bent portions in the lead wire portion such that at least one of the flatwise bent portions is bent in the direction that is opposite to the direction in which the rest are bent. If the two or more flatwise bent portions, at least one of which is bent in the direction that is opposite to the direction in which the rest are bent, are collectively shaped in the lead wire portion by a pair of shaping dies, however, the wire material is elongated by a greater amount in a flatwise bent portion on the base end side than in a flatwise bent portion on the free end side, which may cause an increase in dimensional error of the lead wire portion and an increase in electric resistance of the flatwise bent portion on the base end side. In addition, such an increase in dimensional error and electric resistance may also be caused in the case where a lead wire portion with a cross section that is not rectangular (oblong), e.g. with a square cross section, is bent in a direction that is generally orthogonal to one side of the cross section by a pair of shaping dies.

It is therefore a main object of preferred embodiments to collectively and precisely shape at least two first bent portions that are bent along a first bend direction in a lead wire portion that extends from one end of a coil by use of a pair of shaping dies such that one of the first bent portions is bent in the direction that is opposite to the direction in which the remaining first bent portions are bent.

Preferred embodiments of the present disclosure relate to a coil end shaping apparatus that shapes at least two first bent portions that are bent along a first bend direction in a lead wire portion extending from one end of a coil, including:

first and second shaping dies that come close to and away from each other and that shape the at least two first bent portions by bringing close to each other to bend the lead wire portion in a direction that is different from a moving direction, wherein at least one of the at least two first bent portions is bent in a direction that is opposite to a direction in which the first bent portion other than the at least one first bent portion is bent; and one of the first and second shaping dies has a clearance portion that prevents a portion of the lead wire portion to be bent along the first bend direction on a side closest to a free end from being restrained by not contacting the lead wire portion while the first bent portion on a base end side with respect to one of the at least two first bent portions on the side closest to the free end is shaped in the lead wire portion by the first and second shaping dies.

The coil end shaping apparatus includes the first and second shaping dies which come close to and away from each other, and the at least two first bent portions, at least one of which is bent in the direction that is opposite to the direction in which the rest are bent, are shaped in the lead wire portion which extends from one end of the coil by bringing the first and second shaping dies close to each other to bend the lead wire portion along a direction that is different from the moving direction. In the coil end shaping apparatus, one of the first and second shaping dies has the clearance portion which prevents a portion of the lead wire portion to be bent along the first bend direction on the side closest to the free end from being restrained by not contacting the lead wire portion while the first bent portion on the base end side with respect to one of the at least two first bent portions on the side closest to the free end is shaped in the lead wire portion. In this way, by providing one of the first and second shaping dies with the clearance portion to prevent the portion of the lead wire portion to be bent along the first bend direction on the side closest to the free end from being restrained (plastically deformed) while the first bent portion on the base end side with respect to the one of the at least two first bent portions on the side closest to the free end is shaped (before plastic deformation is caused), it is possible to shape the first bent portion on the base end side of the lead wire portion and to suppress an increase in amount of elongation of the wire material, and to additionally shape the first bent portion on the side closest to the free end. Consequently, it is possible to suppress an increase in dimensional error and electric resistance of each of the first bent portions, and to improve the precision in position of a free end portion of the lead wire portion with respect to the coil, Thus, with the coil end shaping apparatus, it is possible to collectively and precisely shape the at least two first bent portions in the lead wire portion which extends from one end of the coil using the pair of shaping dies such that at least one of the first bent portions is bent in the direction that is opposite to the direction in which the rest are bent.

The other of the first and second shaping dies may have a first shaping surface that includes a plurality of curved surfaces corresponding to the at least two first bent portions; and the clearance portion may be a recessed portion formed in the one of the first and second shaping dies so as to oppose one of the curved surfaces of the first shaping surface corresponding to the one of the at least two first bent portions on the side closest to the free end while the first bent portion on the base end side with respect to the first bent portion on the side closest to the free end is shaped in the lead wire portion by the first and second shaping dies. Consequently, it is possible to bring the portion of the lead wire portion to be bent along the first bend direction on the side closest to the free end and the one of the first and second shaping dies out of contact with each other while the first bent portion on the base end side with respect to the one of the at least two first bent portions on the side closest to the free end is shaped by bringing the first and second shaping dies close to each other. This prevents the portion of the lead wire portion to be bent along the first bend direction on the side closest to the free end from being restrained by the first and second shaping dies.

The one of the first and second shaping dies may have a pressing surface that extends in parallel with the lead wire portion and that is inclined so as to approach the first shaping surface as the first and second shaping dies come close to each other; and the recessed portion may be formed so as to open on a pressing surface side. Consequently, it is possible to shape the first bent portion on the base end side with respect to the one of the at least two first bent portions on the side closest to the free end by pressing the lead wire portion against the first shaping surface of the other of the first and second shaping dies using the pressing surface of the one of the first and second shaping dies while preventing the portion of the lead wire portion to be bent along the first bend direction on the side closest to the free end from being restrained by the first and second shaping dies.

The one of the first and second shaping dies may be a movable die that comes close to and away from the other, and the other of the first and second shaping dies may be a fixed die. Consequently, by moving the movable die toward the fixed die with the lead wire portion supported by the fixed die, it is possible to collectively and precisely shape the at least two first bent portions in the lead wire portion which extends from one end of the coil using the pair of shaping dies such that at least one of the first bent portions is bent in the direction that is opposite to the direction in which the rest are bent.

The first and second shaping dies may be configured not to restrain a portion of the lead wire portion on a free end side with respect to the first bent portion on the side closest to the free end. Consequently, it is possible to suppress fluctuations in amount of elongation of the wire material between the at least two first bent portions.

Three first bent portions may be shaped in the lead wire portion, and one of the three first bent portions on a side closest to a base end may be bent in a direction that is opposite to a direction in which the remaining two are bent.

The first and second shaping dies may be configured to shape at least one second bent portion that is bent along a second bend direction that is orthogonal to the first bend direction by bringing close to each other. Consequently, it is possible to shape the at least two first bent portion and the at least one second bent portion in the lead wire portion in a short time by bringing the first and second shaping dies close to each other.

The coil may be formed by winding a rectangular wire; and the first bend direction may be a flatwise direction, The first and second shaping dies may be configured to bend the lead wire portion along a direction that is orthogonal to the moving direction.

Aspects of preferred embodiments provide
a coil end shaping method for forming at least two first bent portions that are bent along a first bend direction in a lead wire portion extending from one end of a coil, using first and second shaping dies that come close to and away from each other, by bending the lead wire portion along a direction that is different from a moving direction of the first and second shaping dies, including:
a step of shaping the at least two first bent portions in the lead wire portion such that at least one of the at least two first bent portions is bent in a direction that is opposite to a direction in which the first bent portion other than the at least one first bent portion is bent by bringing the first and second shaping dies close to each other, wherein
a portion of the lead wire portion to be bent along the first bend direction on a side closest to a free end is prevented from being restrained while the first bent portion on a base end side with respect to one of the at least two first bent portions on the side closest to the free end is shaped in the lead wire portion by the first and second shaping dies.

With the method, it is possible to collectively and precisely shape the at least two first bent portions in the lead wire portion which extends from one end of the coil using the pair of shaping dies such that at least one of the first bent portions is bent in the direction that is opposite to the direction in which the rest are bent.

DESCRIPTION

Now, an embodiment will be described with reference to the drawings.

Figure 1:
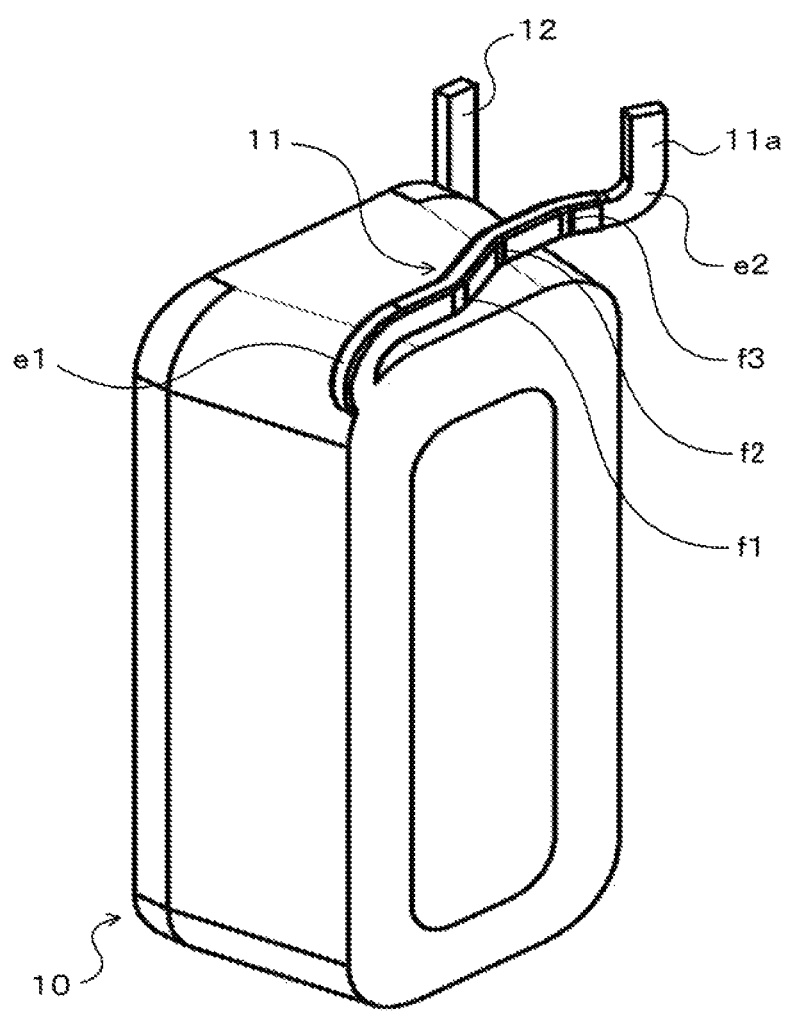
FIG. 1 is a perspective view illustrating an example of a coil shaped by a coil end shaping apparatus according to a preferred embodiment.

FIG. 1 is a perspective view illustrating an example of a coil shaped by a coil end shaping apparatus according to a preferred embodiment. A coil 10 illustrated in the drawing is included in an electric motor stator (not illustrated) that constitutes a 3-phase AC electric motor that is used as a drive source and/or an electric generator for an electric vehicle or a hybrid vehicle, for example, together with a rotor (not illustrated). The coil 10 is formed by winding a rectangular wire with a rectangular cross section a plurality of times. A long-length lead wire portion 11 extends from one end of the coil 10. A short-length connection end portion 12 extends from the other end of the coil 10. The electric motor stator includes at least one coil 10, a plurality of coils that are slightly different in configuration of the lead wire portion from the coil 10, and a stator core (not illustrated). The stator core has a plurality of divided cores disposed in an annular arrangement, and a fixation ring to which the divided cores are fixed. The coil 10 is mounted to a corresponding divided core via an insulating member (not illustrated), The electric motor stator (stator core) is coated with a molded resin such as a thermosetting resin or a thermoplastic resin on both sides in the axial direction.

As illustrated in FIG. 1, the lead wire portion 11 of the coil 10 has two edgewise bent portions (second bent portions) e1 and e2 that are bent along the edgewise direction (second bend direction: a direction that is generally orthogonal to the short side of the cross section), and three flatwise bent portions (first bent portions) f1, f2, and f3 that are bent along the flatwise direction (first bend direction: a direction that is generally orthogonal to the long side of the cross section). In the embodiment, the two edgewise bent portions e1 and e2 and the three flatwise bent portions f1 to f3 are shaped such that the lead wire portion 11 extends upward in the drawing in the axial direction of the stator core from the outer peripheral side of the coil 10 to be bent at a right angle with respect to the axial direction, and extends once toward the outer peripheral side of the stator and then toward the inner peripheral side of the stator such that a free end portion 11a extends upward in the drawing. That is, the two edgewise bent portions e1 and e2 are bent in directions that are opposite to each other, and the flatwise bent portion f1 on the side closest to the base end, of the three flatwise bent portions f1 to f3, is bent in the direction that is opposite to the direction in which the remaining flatwise bent portions f2 and f3 are bent.

Figure 2:
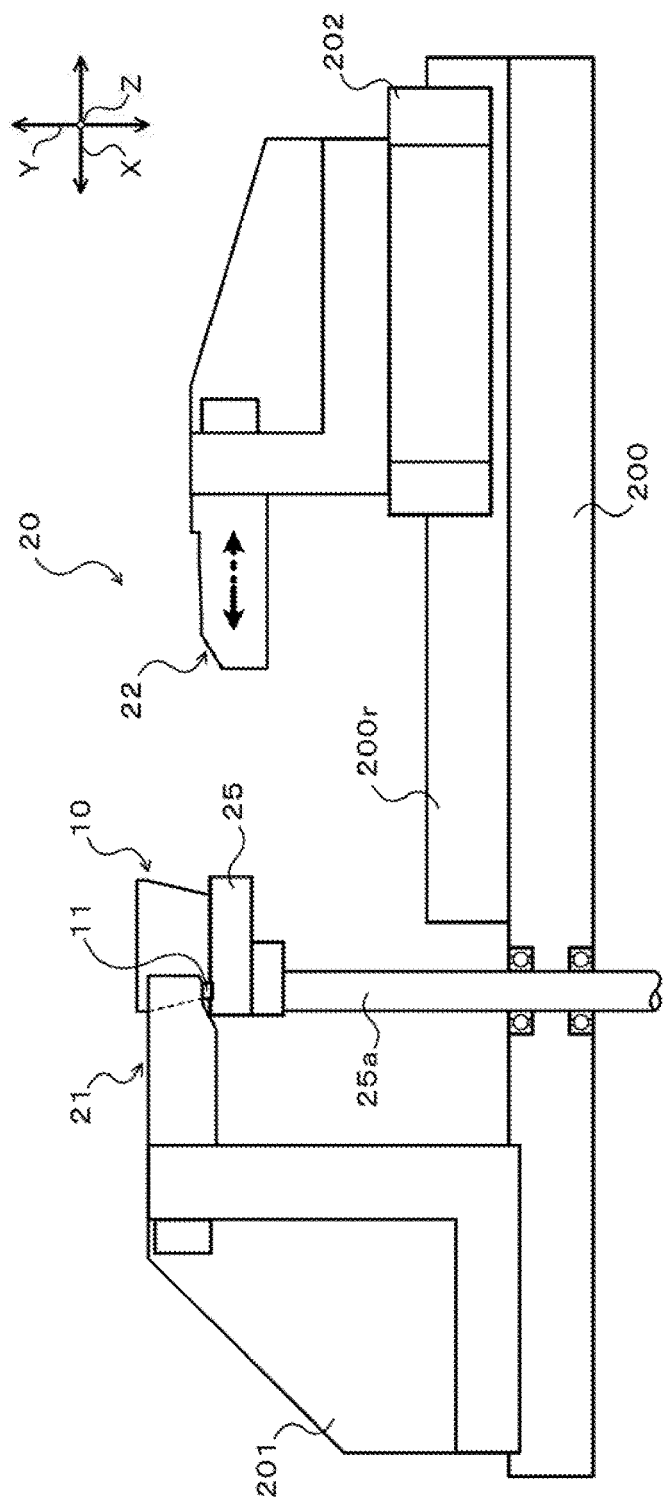
FIG. 2 is a side view illustrating the coil end shaping apparatus according to a preferred embodiment.
Figure 3:
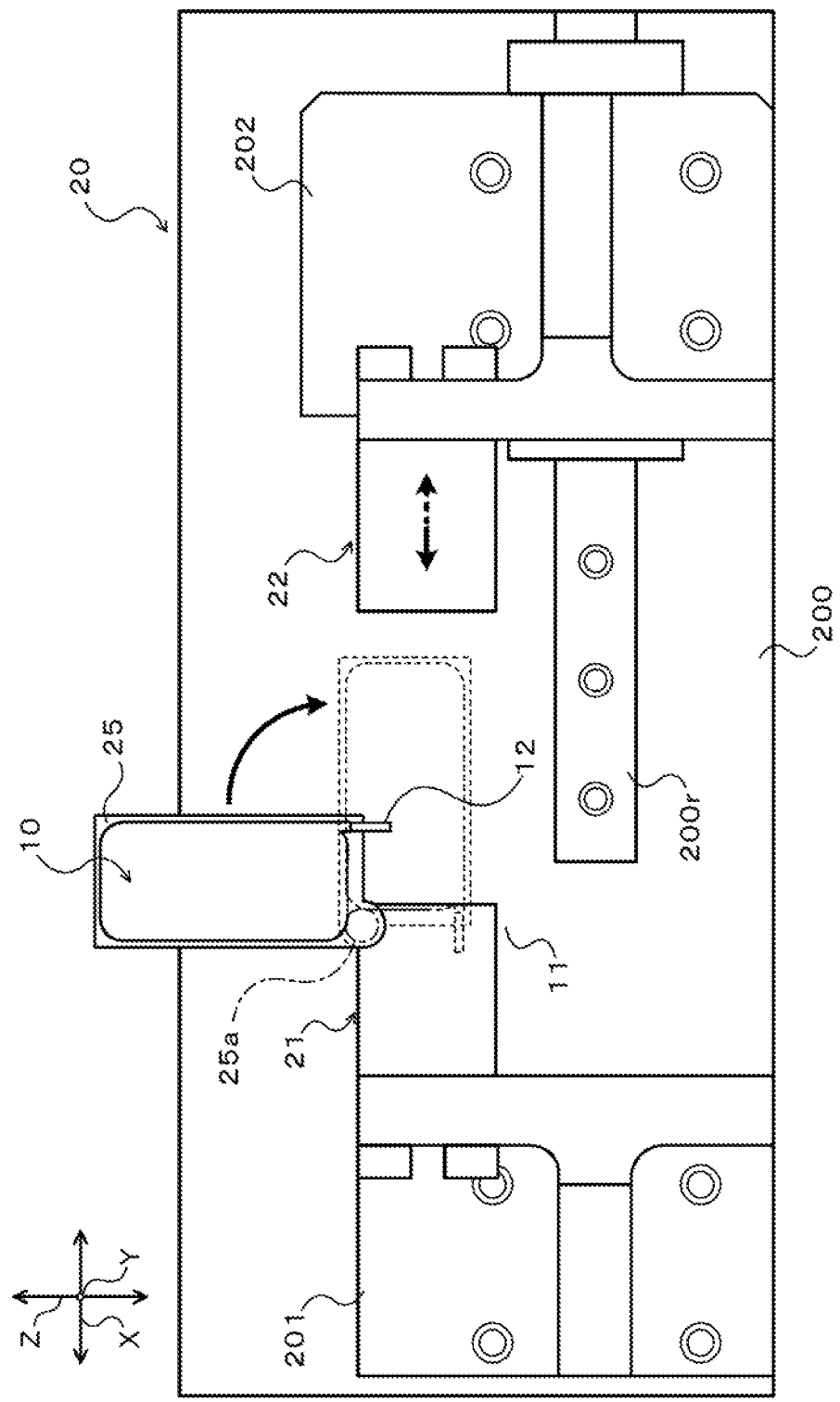
FIG. 3 is a plan view illustrating the coil end shaping apparatus according to a preferred embodiment.

FIG. 2 is a side view illustrating a coil end shaping apparatus 20 used to shape the lead wire portion 11 of the coil 10. FIG. 3 is a plan view illustrating the coil end shaping apparatus 20. As illustrated in the drawings, the coil end shaping apparatus 20 includes a first shaping die 21 and a second shaping die 22 configured to shape the plurality of edgewise bent portions e1 and e2 and the plurality of flatwise bent portions f1 to f3 in the lead wire portion 11 of the coil 10, and a coil support portion 25 that supports the coil 10.

Figure 4:
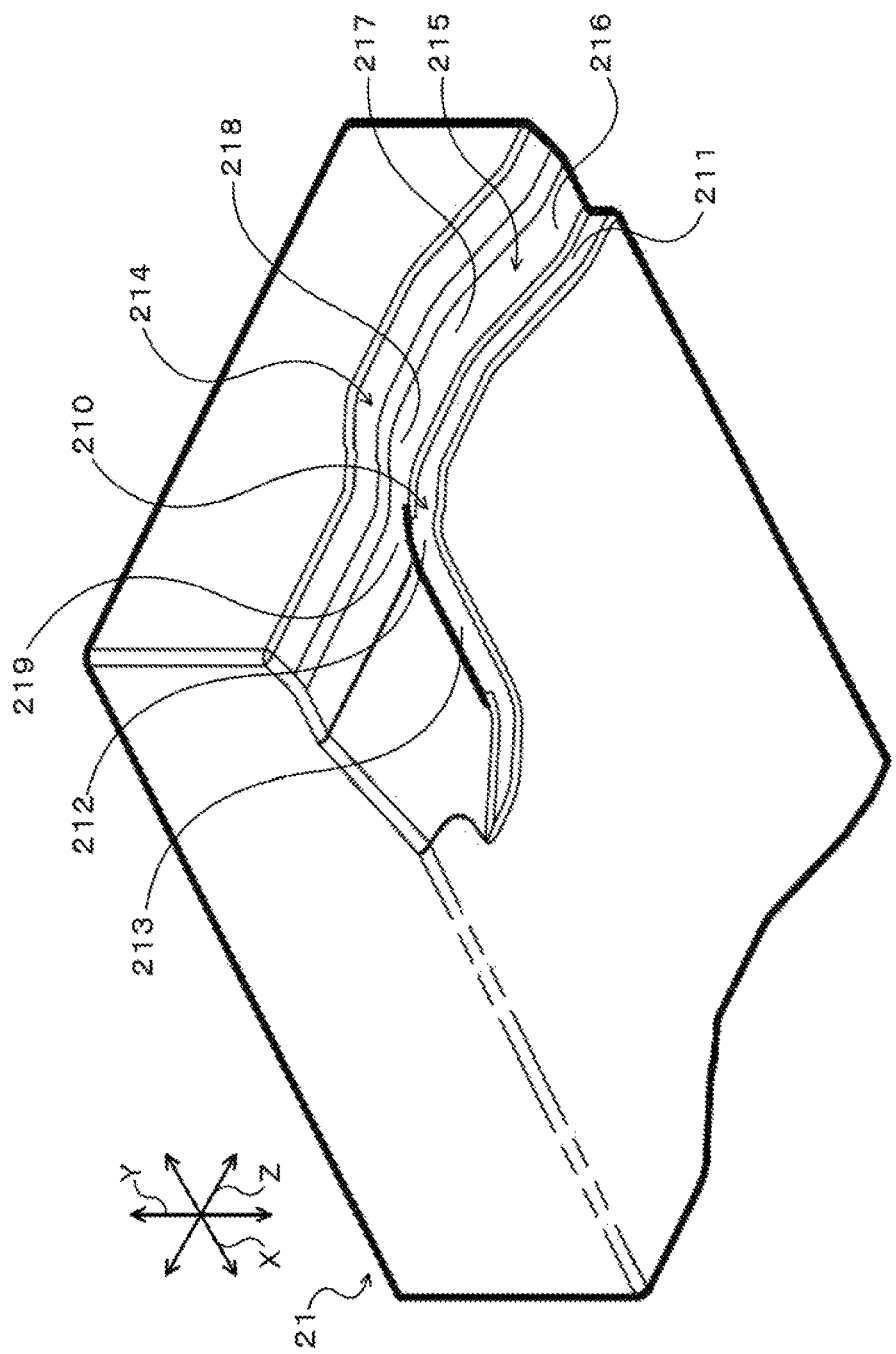
FIG. 4 is a perspective view illustrating a first shaping die.
Figure 5:
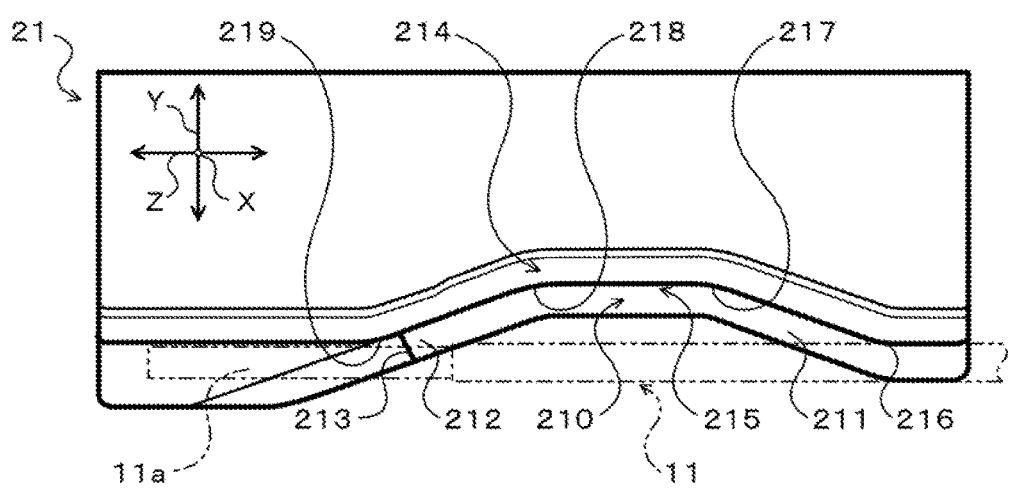
FIG. 5 is a front view illustrating the first shaping die.

The first shaping die 21 is a fixed die that is fixed to a base portion 200 placed at the location of installation of the coil end shaping apparatus 20 via a support block 201. As illustrated in FIGS. 4 and 5, the first shaping die 21 has a first edgewise shaping surface 210 configured to shape the edgewise bent portion e2 in the lead wire portion 11 of the coil 10, and a flatwise shaping surface (first shaping surface) 215 configured to shape the flatwise bent portions f1 to f3 in the lead wire portion 11. The first edgewise shaping surface 210 is generally formed in an L-shape. The first edgewise shaping surface 210 includes: a pressure reception surface (support surface) 211 that extends along the Z direction in the drawings; a curved surface 212 that is continuous with the pressure reception surface 211 and that corresponds to the edgewise bent portion e2; and a pressure reception surface 213 that is continuous with the curved surface 212 and that extends generally in parallel with the X direction in the drawings. The first edgewise shaping surface 210, that is, the pressure reception surface 211, the curved surface 212, and the pressure reception surface 213, extends in the Y direction in the drawings.

In addition, the flatwise shaping surface 215 is a recessed surface which extends in the Z direction in the drawings and generally the center portion of which in the longitudinal direction is dented upward in the drawings. The flatwise shaping surface 215 includes: a curved surface 216 corresponding to the flatwise bent portion f1; a curved surface 217 corresponding to the flatwise bent portion f2; a curved surface 218 corresponding to the flatwise bent portion f3; and a pressing surface 219 that presses the free end portion 11a of the lead wire portion 11. As illustrated in FIG. 5, the curved surface 216 corresponding to the flatwise bent portion f1 and the pressing surface 219 are each a projecting surface that projects downward in the drawing. In contrast, the curved surface 217 corresponding to the flatwise bent portion f2 and the curved surface 218 corresponding to the flatwise bent portion f3 are each a recessed surface that is dented upward in the drawing. Furthermore, on the first shaping die 21, a gently curved guide surface 214 is formed such that the guide surface 214 is positioned on the second shaping die 22 side (right side in FIG. 2) with respect to the flatwise shaping surface 215 and inclines upward in the drawing as the guide surface 214 extends toward the second shaping die 22.

Figure 6:
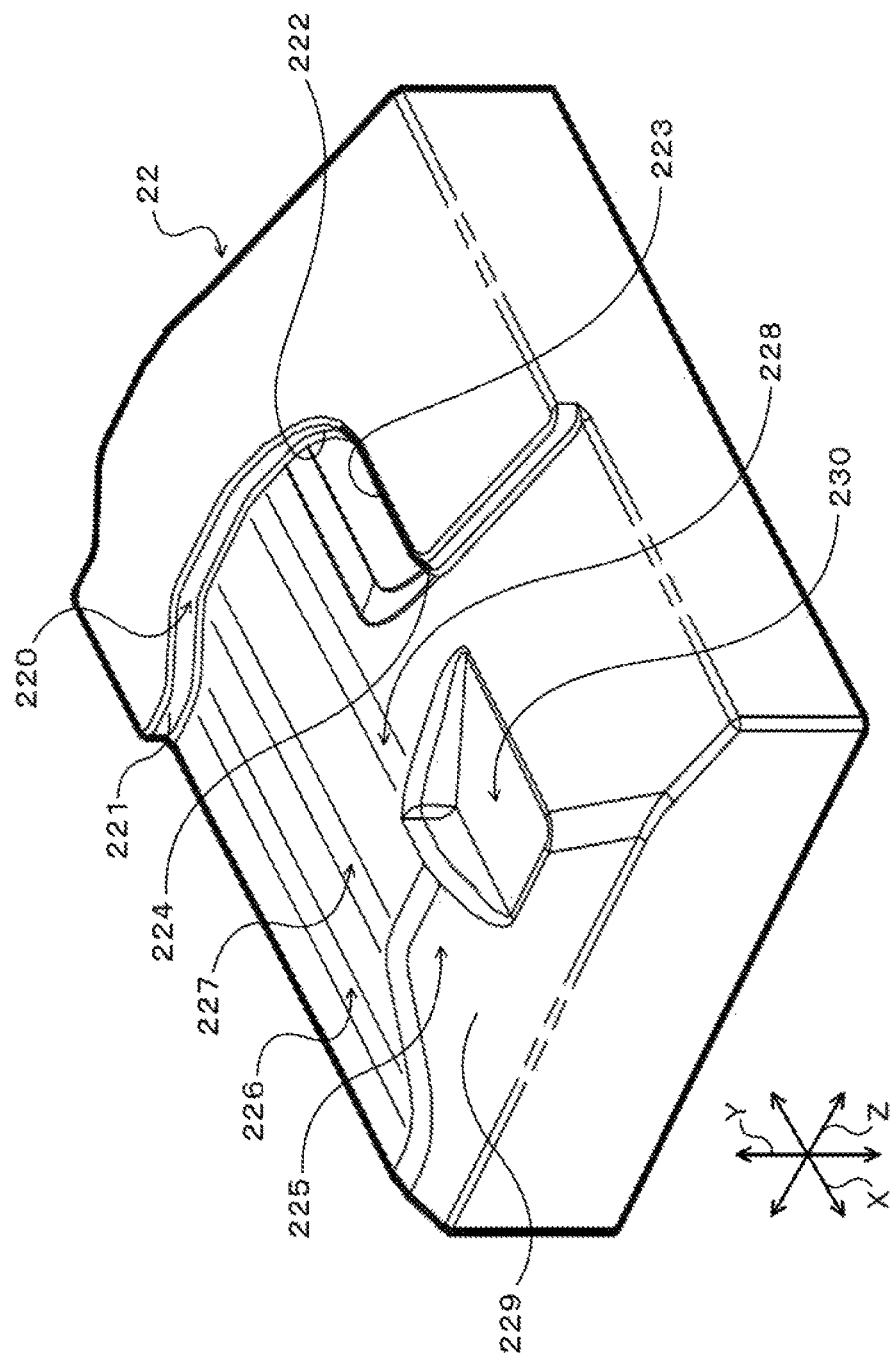
FIG. 6 is a perspective view illustrating a second shaping die.

The second shaping die 22 is a movable die that is supported by a movable stage 202. The movable stage 202 is movably supported by a guide rail 200r fixed to the base portion 200 to extend transversely in FIG. 2, that is, along the X direction (moving direction), and is driven by a drive unit (not illustrated) that includes an electric motor, a hydraulic cylinder, or the like to be advanceable and retractable along the extension direction of the guide rail 200r, that is, the X direction in FIG. 2. The second shaping die 22 can be moved toward the first shaping die 21, which is a fixed die, in the direction indicated by the solid arrow in FIG. 2 etc., and moved away from the first shaping die 21 in the direction indicated by the dotted arrow in FIG. 2 etc. As illustrated in FIG. 6, the second shaping die 22 has a second edgewise shaping surface 220 configured to shape the edgewise bent portions e1 and e2 in the lead wire portion 11 of the coil 10, and a flatwise shaping portion 225 configured to shape the flatwise bent portions f1 to f3 in the lead wire portion 11.

Figure 7:
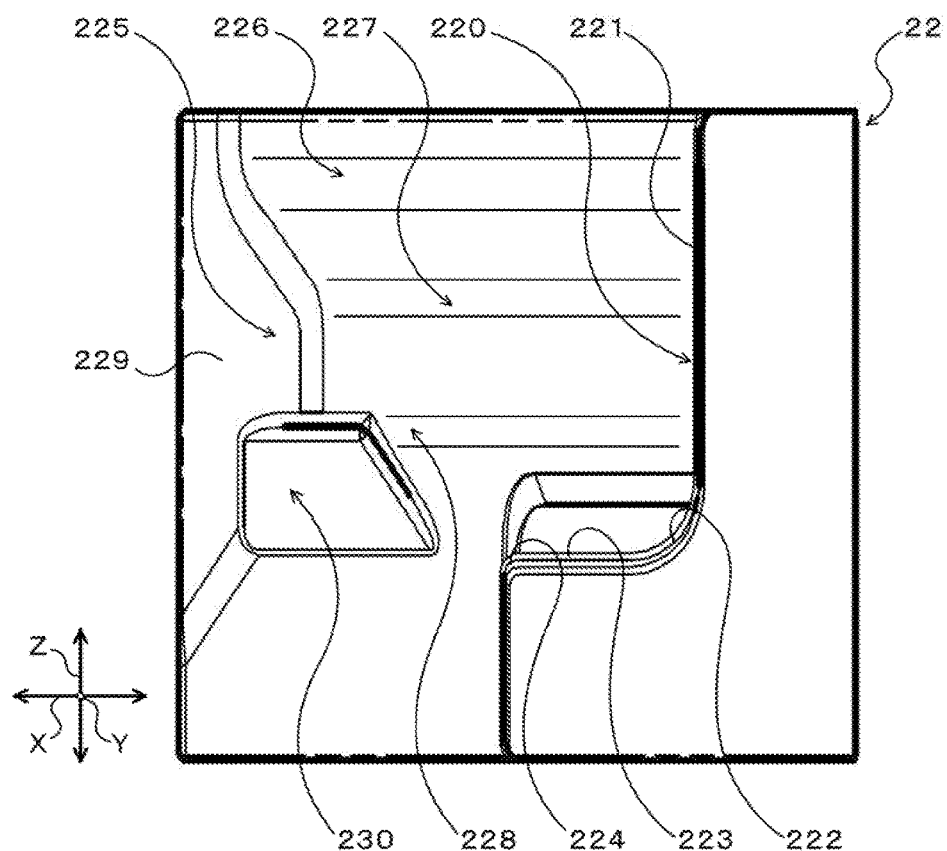
FIG. 7 is a plan view illustrating the second shaping die.
Figure 8:
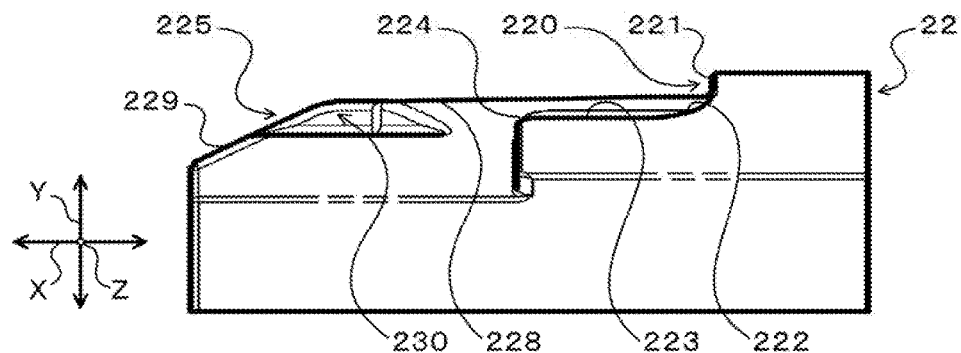
FIG. 8 is a side view illustrating the second shaping die.

As illustrated in FIGS. 6 to 8, the second edgewise shaping surface 220 is positioned on the base end portion side of the second shaping die 22, which is fixed to the movable stage 202, with respect to the flatwise shaping portion 225, and formed on the second shaping die 22 so as to extend in parallel with the first edgewise shaping surface 210 of the first shaping die 21. As illustrated in the drawings, the second edgewise shaping surface 220 includes: a pressing surface 221 that extends in the Z direction in the drawings so as to oppose the pressure reception surface 211 of the first edgewise shaping surface 210; a curved surface 222 that is continuous with the pressing surface 221 and that corresponds to the edgewise bent portion e2; a pressing surface 223 that is continuous with the curved surface 222 and that extends generally in parallel with the X direction in the drawings toward the free end of the second shaping die 22 so as to oppose the pressure reception surface 213 of the first edgewise shaping surface 210; and a pressing surface 224 that is a curved surface that is continuous with the pressing surface 223 and that is bent in the Z direction in the drawings.

In addition, as illustrated in FIGS. 6 to 8, the flatwise shaping portion 225 is formed on the second shaping die 22 so as to be positioned on the free end side of the second shaping die 22 (on the first shaping die 21 side) with respect to the second edgewise shaping surface 220. As illustrated in the drawings, the flatwise shaping portion 225 includes: a curved surface 226 corresponding to the flatwise bent portion f1; a curved surface 227 corresponding to the flatwise bent portion f2; a curved surface 228 corresponding to the flatwise bent portion f3; a pressing surface 229 formed on the free end side of the second shaping die 22 (on the first shaping die 21 side) with respect to the curved surfaces 226 to 228; and an clearance portion 230.

As illustrated in FIG. 6, the curved surface 226 corresponding to the flatwise bent portion f1 is a recessed surface that is dented downward in the drawing. In contrast, the curved surface 227 corresponding to the flatwise bent portion f2 and the curved surface 228 corresponding to the flatwise bent portion f3 are each a projecting surface that projects upward in the drawing. The curved surfaces 226 to 228 are formed on the free end side of the second shaping die 22 (on the first shaping die 21 side) with respect to the second edgewise shaping surface 220. In addition, the pressing surface 229 is a flat inclined surface that extends in the Z direction in the drawing and that is formed to approach the base portion 200 as the pressing surface 229 extends from the base end side toward the free end side of the second shaping die 22 along the X direction in the drawing. As illustrated in the drawing, a gently curved guide surface is formed between the pressing surface 229 and the curved surfaces 226, 227, etc. which are disposed on the base end side of the second shaping die 22 with respect to the pressing surface 229.

The clearance portion 230 of the flatwise shaping portion 225 is a recessed portion formed in the second shaping die 22 to open on the pressing surface 229 side and to extend in the X direction in the drawing so as to interrupt the continuity between the curved surface 228, which corresponds to the flatwise bent portion f3 which is shaped in the side closest to the free end of the lead wire portion 11, and the pressing surface 229. While the flatwise bent portions f1 and f2 which are on the base end side with respect to the flatwise bent portion f3 on the side closest to the free end, of the three flatwise bent portions f1 to f3, are shaped in the lead wire portion 11 by the first and second shaping dies 21 and 22, the clearance portion 230 opposes the curved surface 218 corresponding to the flatwise bent portion f3 of the flatwise shaping surface 215 of the first shaping die 21 and does not contact the lead wire portion 11. As illustrated in the drawing, a gently curved guide surface is formed between the outer periphery of the clearance portion 230 and the pressing surface 229, the curved surface 228, etc. which surround the clearance portion 230.

The coil support portion 25 is configured to be able to support the coil 10 such that the lead wire portion 11 extends along the Z direction in the drawing as indicated by the solid line in FIG. 3. In addition, the coil support portion 25 has a rotary shaft 25a that extends in the Y direction in the drawing, or in the flatwise direction of the lead wire portion 11 of the coil 10, which is supported by the coil support portion 25 to extend horizontally. The coil support portion 25 may be driven by a drive unit (not illustrated) to be turned clockwise in FIG. 3 about the axis of the rotary shaft 25a. Furthermore, the coil end shaping apparatus 20 includes a bend guide portion (not illustrated) configured to shape the edgewise bent portion e1 on the side closest to the base end in the lead wire portion 11. The bend guide portion has a pair of guide members that guide the lead wire portion 11 of the coil 10 supported by the coil support portion 25 from both sides, and a columnar bend fulcrum portion that serves as the bend fulcrum for the edgewise bent portion e1 on the side closest to the base end of the lead wire portion 11.

Consequently, by turning the coil support portion 25 about the axis of the rotary shaft 25a, it is possible to bend the lead wire portion 11 in the edgewise direction about the bend fulcrum portion to shape the edgewise bent portion e1 on the side closest to the base end in the lead wire portion 11. The bend fulcrum portion is disposed such that the outer peripheral surface (columnar surface) of the bend fulcrum portion contacts (a side surface of) the lead wire portion 11, and the axis of the bend fulcrum portion is offset from the axis of the rotary shaft 25a of the coil support portion 25 such that the lead wire portion 11 is not moved with respect to the coil support portion 25 and the bend guide portion when the edgewise bent portion e1 is shaped. Consequently, it is possible to suppress damage to the lead wire portion 11 due to being rubbed against the bend fulcrum portion when the edgewise bent portion e1 is shaped. In the embodiment, in addition, the axis of the rotary shaft 25a of the coil support portion 25 is offset from the bend fulcrum portion such that the lead wire portion 11 is not moved with respect to the coil support portion 25 and the bend guide portion, that is, such that the lead wire portion 11 is not elongated with both the free end side of the lead wire portion 11 held (restrained) by the first and second shaping dies 21 and 22 and the base end side of the lead wire portion 11 supported by the coil support portion 25 being restrained, when the coil support portion 25 is turned to shape the edgewise bent portion e1. Consequently, it is possible to prevent the lead wire portion 11 from being elongated to become thin when the edgewise bent portion e1 is shaped.

Next, a coil end shaping method according to a preferred embodiment, that is, a procedure for shaping the lead wire portion 11 of the coil 10 using the coil end shaping apparatus 20 discussed above, will be described.

Before shaping the lead wire portion 11 using the coil end shaping apparatus 20, the movable stage 202 is moved to the stand-by position illustrated in FIG. 2 to move the second shaping die 22 away from the first shaping die 21. Furthermore, the coil support portion 25 is turned to the initial position indicated by the solid line in FIG. 3 to allow the coil 10 having the lead wire portion 11 extending straight to be supported on the coil support portion 25 (see FIGS. 3 and 4), and the lead wire portion 11 is placed between the pair of guide members of the bend guide portion (not illustrated). When the coil 10 is set to the coil support portion 25 in this way, a side surface of the lead wire portion 11 on the first shaping die 21 side abuts against a part of the pressure reception surface 211 which is included in the first edgewise shaping surface 210 of the first shaping die 21, and the lead wire portion 11 extends straight along the Z direction in the drawings (see the solid line in FIG. 3 and the dash-double-dot line in FIG. 5). In the embodiment, a coating applied to the surface has been removed in advance from the free end portion 11a prior to the shaping of the lead wire portion 11.

Figure 9:
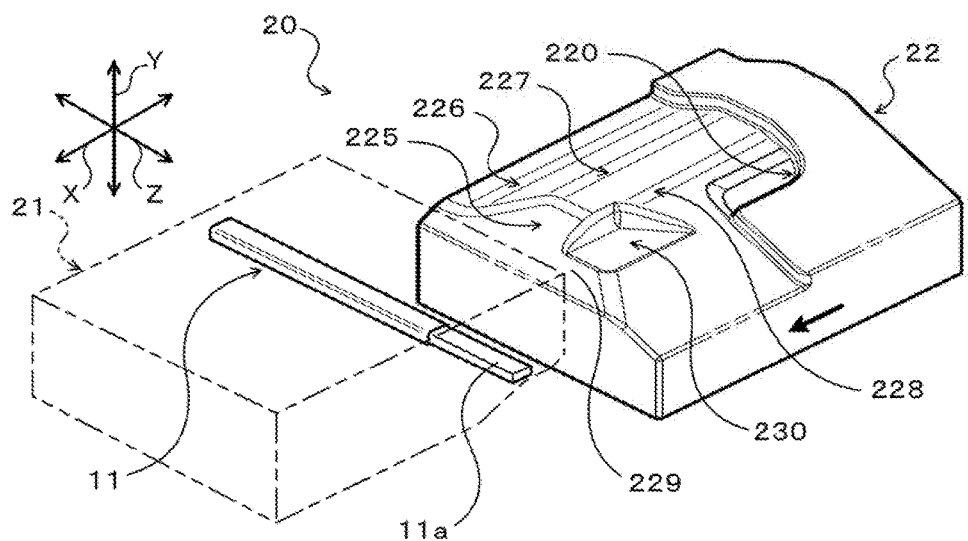
FIG. 9 is a perspective view illustrating a procedure for shaping a lead wire portion using the coil end shaping apparatus according to a preferred embodiment.
Figure 10:
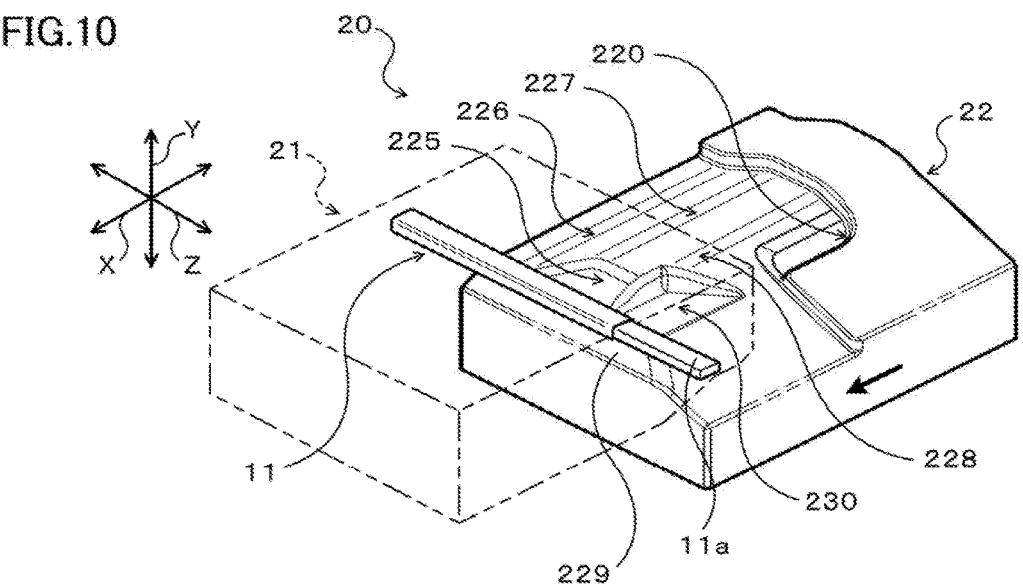
FIG. 10 is a perspective view illustrating the procedure for shaping the lead wire portion using the coil end shaping apparatus according to a preferred embodiment.

Subsequently, as illustrated in FIG. 9, the movable stage 202 and the second shaping die 22 are moved by the drive unit (not illustrated) for the movable stage 202 along the X direction from the stand-by position toward (closer to) the first shaping die 21 by a distance determined in advance such that the gap between the first edgewise shaping surface 210 and the second edgewise shaping surface 220 coincides with the width of the lead wire portion 11. As the movable stage 202 and the second shaping die 22 are moved toward the first shaping die 21, as illustrated in FIG. 10, the pressing surface 229 which constitutes the flatwise shaping portion 225 of the second shaping die 22 abuts against an edge portion of a side surface of the lead wire portion 11 on the second shaping die 22 side to press the lead wire portion 11 toward the flatwise shaping surface 215 of the first shaping die 21. That is, a force is applied in the direction which is orthogonal to the pressing surface 229 from the second shaping die 22 to the lead wire portion 11 which is supported in the X direction by the pressure reception surface 211 of the first shaping die 21, and a portion of the lead wire portion 11 between a portion in abutment with the curved surface 216 and a portion in abutment with the pressing surface 219 is gradually elastically deformed toward the curved surfaces 217 and 218 of the flatwise shaping surface 215.

Figure 11:
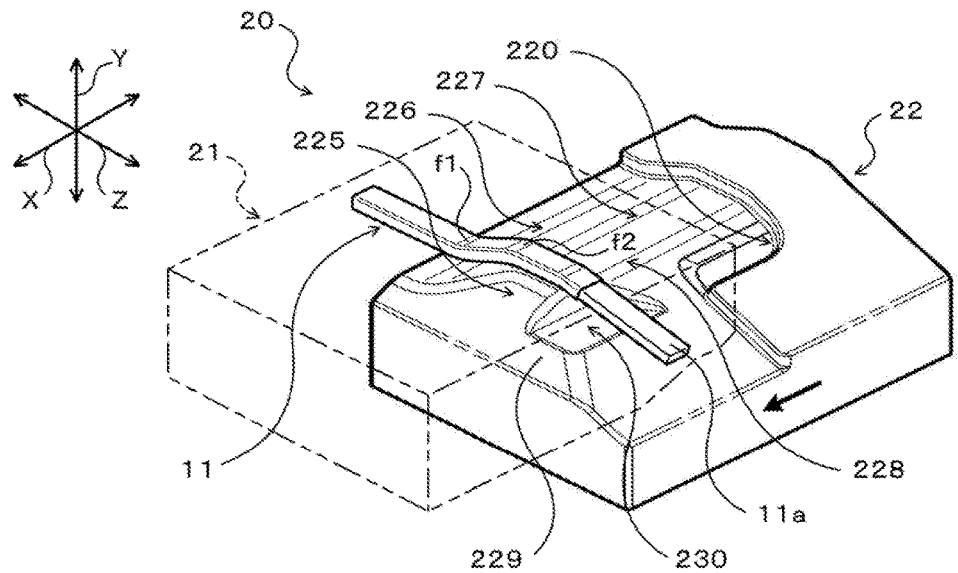
FIG. 11 is a perspective view illustrating the procedure for shaping the lead wire portion using the coil end shaping apparatus according to a preferred embodiment.
Figure 12:
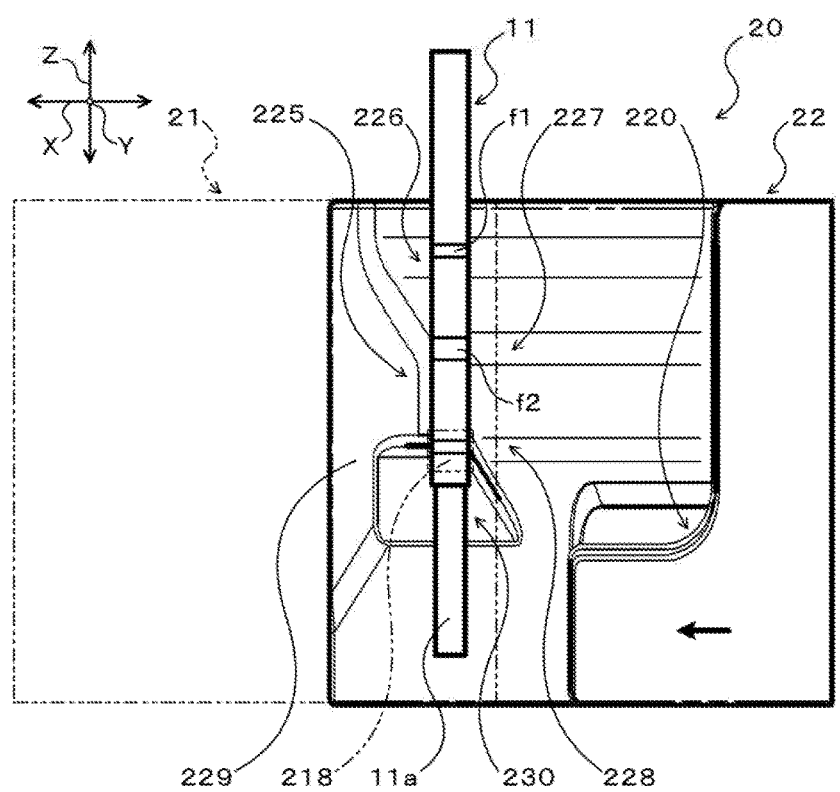
FIG. 12 is a plan view illustrating the procedure for shaping the lead wire portion using the coil end shaping apparatus according to a preferred embodiment.

Furthermore, when the lead wire portion 11 is brought into abutment with the curved surfaces 226 and 227 which constitute the flatwise shaping portion 225 of the second shaping die 22 as the movable stage 202 and the second shaping die 22 are moved toward the first shaping die 21, as illustrated in FIGS. 11 and 12, a part of the lead wire portion 11 is pressed against the curved surface 216 of the flatwise shaping surface 215 of the first shaping die 21 by the curved surface 226 of the second shaping die 22 to be plastically deformed. Concurrently, a part of the lead wire portion 11 is pressed against the curved surface 217 of the flatwise shaping surface 215 of the first shaping die 21 by the curved surface 227 of the second shaping die 22 to be plastically deformed. Consequently, the two flatwise bent portions f1 and f2 on the base end side are shaped in the lead wire portion 11.

Figure 13:
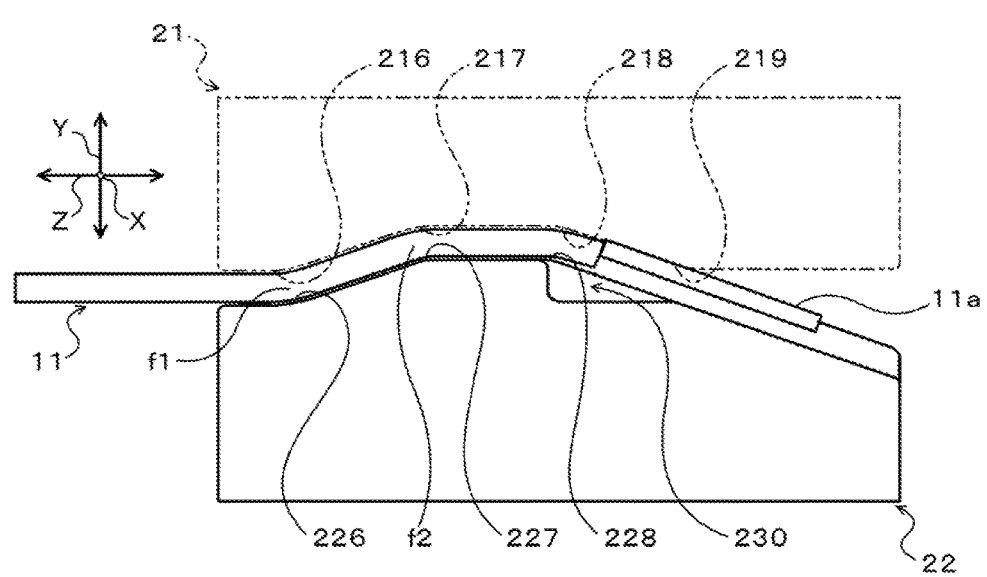
FIG. 13 is a schematic view illustrating the procedure for shaping the lead wire portion using the coil end shaping apparatus according to a preferred embodiment.

In the coil end shaping apparatus 20 according to the embodiment, while the two flatwise bent portions f1 and f2 on the base end side are shaped in the lead wire portion 11 (before plastic deformation is caused), as illustrated in FIGS. 12 and 13, the clearance portion 230, which is a recessed portion formed between the curved surface 228, which corresponds to the flatwise bent portion f3 and the pressing surface 229 of the second shaping die 22, opposes the curved surface 218, which corresponds to the flatwise bent portion f3, of the flatwise shaping surface 215 of the first shaping die 21 via the lead wire portion 11. That is, while the two flatwise bent portions f1 and f2 on the base end side are formed in the lead wire portion 11, a portion of the lead wire portion 11 to be bent along the flatwise direction on the side closest to the free end (a portion corresponding to the flatwise bent portion f3) is pressed by the curved surface 218 of the flatwise shaping surface 215 of the first shaping die 21 to be elastically deformed, but not restrained by the second shaping die 22 (not pressed against the second shaping die 22) because of the presence of the clearance portion 230. In addition, in the embodiment, as illustrated in FIG. 13, the second shaping die 22 is configured not to abut against a portion of the lead wire portion 11 on the free end side with respect to the portion of the lead wire portion 11 to be bent along the flatwise direction on the side closest to the free end even if the portion of the lead wire portion 11 on the free end side is pressed by the pressing surface 219 of the first shaping die 21.

Consequently, in the coil end shaping apparatus 20, the portion of the lead wire portion 11 to be bent along the flatwise direction on the side closest to the free end and the portion on the free end side with respect thereto can be prevented from being restrained (plastically deformed) while the flatwise bent portions f1 and f2 on the base end side with respect to the flatwise bent portion f3 on the side closest to the free end, of the three flatwise bent portions f1 to f3, are shaped. As a result, it is possible to shape the flatwise bent portions f1 and f2 on the base end side of the lead wire portion 11 and to suppress an increase in amount of elongation of the wire material.

Figure 14:
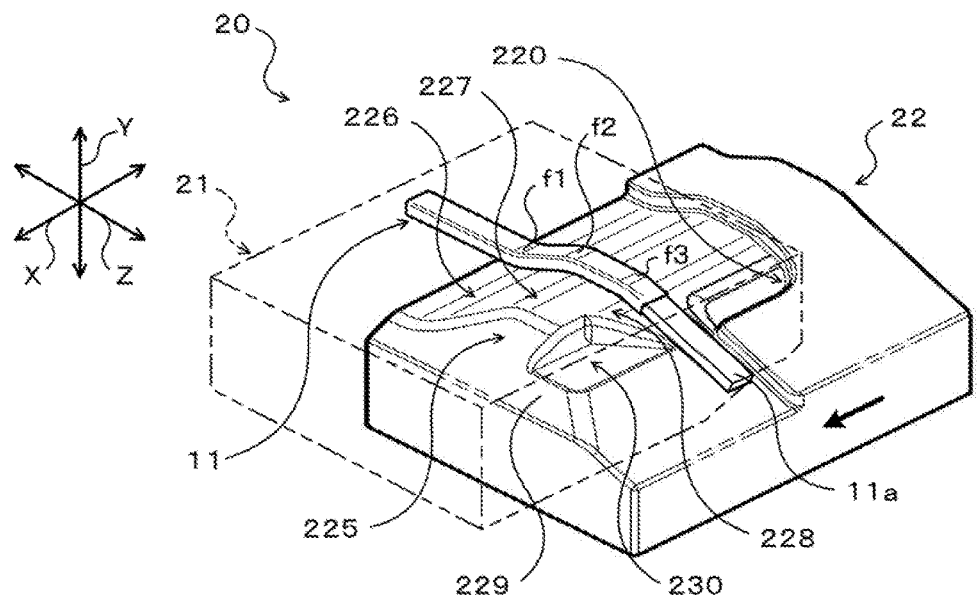
FIG. 14 is a perspective view illustrating the procedure for shaping the lead wire portion using the coil end shaping apparatus according to a preferred embodiment.
Figure 15:
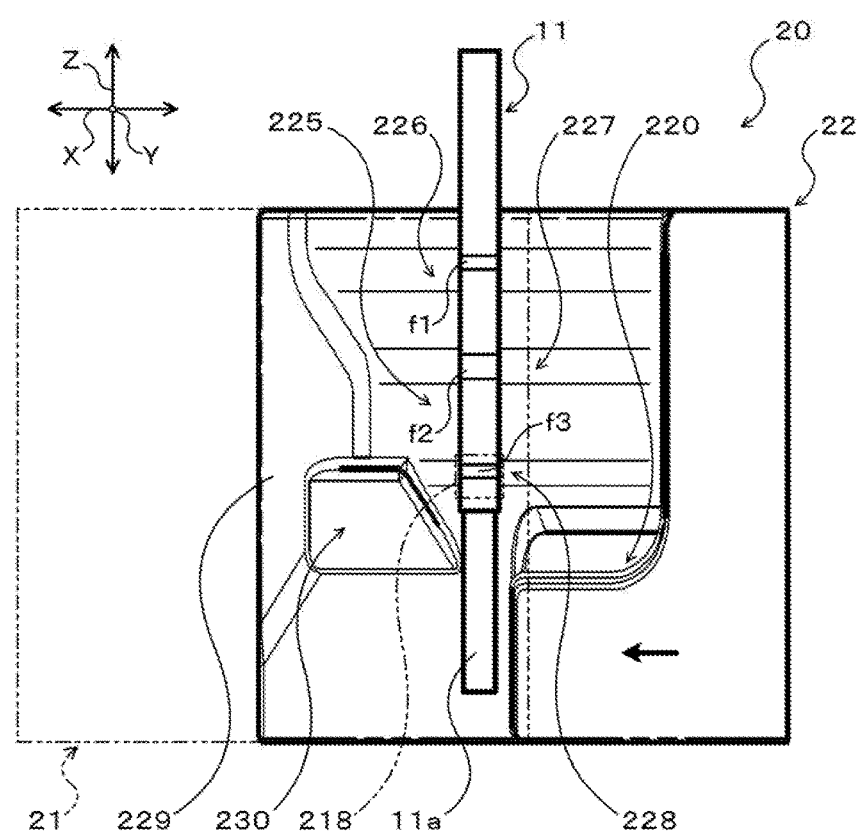
FIG. 15 is a plan view illustrating the procedure for shaping the lead wire portion using the coil end shaping apparatus according to a preferred embodiment.

When the movable stage 202 and the second shaping die 22 are further moved toward the first shaping die 21 after the two flatwise bent portions f1 and f2 on the base end side are shaped in the lead wire portion 11, as illustrated in FIGS. 14 and 15, the portion of the lead wire portion 11 to be bent along the flatwise direction on the side closest to the free end abuts against the curved surface 228 which constitutes the flatwise shaping portion 225 of the second shaping die 22. Consequently, the portion of the lead wire portion 11 to be bent along the flatwise direction on the side closest to the free end is pressed against the curved surface 218 of the flatwise shaping surface 215 of the first shaping die 21 by the curved surface 228 of the second shaping die 22 to be plastically deformed, and the flatwise bent portion f3 on the side closest to the free end is shaped in the lead wire portion 11.

Figure 16:
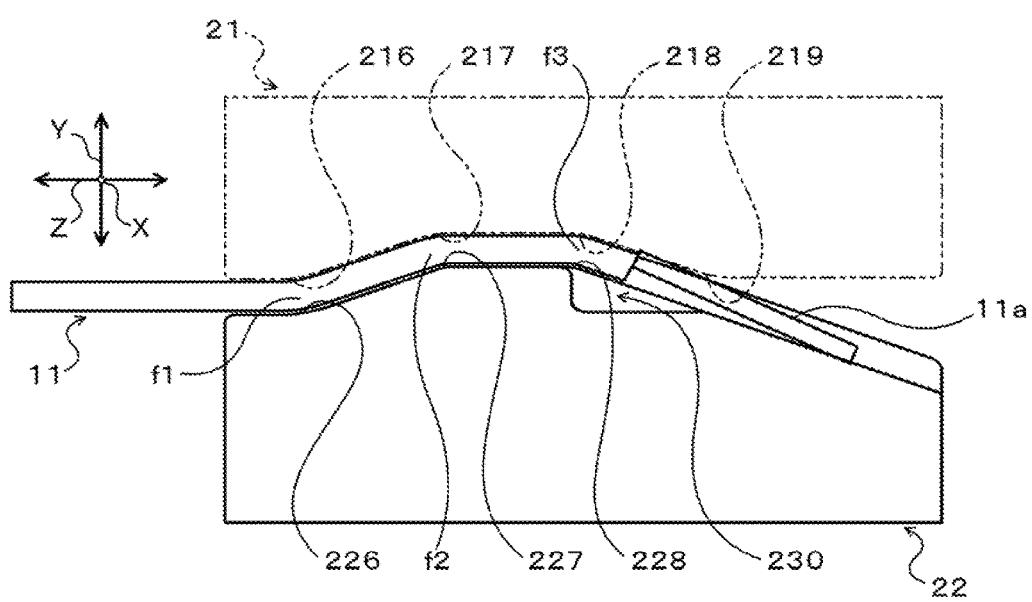
FIG. 16 is a schematic view illustrating the procedure for shaping the lead wire portion using the coil end shaping apparatus according to a preferred embodiment.

In addition, in the embodiment, as illustrated in FIG. 16, the second shaping die 22 is configured not to abut against a portion of the lead wire portion 11 on the free end side with respect to the portion of the lead wire portion 11 to be bent along the flatwise direction on the side closest to the free end even if the portion of the lead wire portion 11 on the free end side, that is, the free end portion 11a from which the coating has been removed, is pressed by the pressing surface 219 etc. of the first shaping die 21. Consequently, in the coil end shaping apparatus 20, the portion on the free end side with respect to the flatwise bent portion f3 can be prevented from being restrained while the flatwise bent portion f3 on the side closest to the free end, of the three flatwise bent portions f1 to f3, is shaped. As a result, it is possible to shape the flatwise bent portion f3 on the side closest to the free end of the lead wire portion 11 and to suppress an increase in amount of elongation of the wire material.

As discussed above, with the coil end shaping apparatus 20, it is possible to shape the flatwise bent portions f1 to f3 of the lead wire portion 11 and to suppress an increase in amount of elongation of the wire material. As a result, it is possible to suppress an increase in dimensional error and electric resistance of the flatwise bent portions f1 to f3, and to improve the precision in position of the free end portion 11a of the lead wire portion 11 with respect to the coil 10. Thus, with the coil end shaping apparatus 20, it is possible to collectively and precisely shape the three flatwise bent portions f1 to f3 in the lead wire portion 11 which extends from one end of the coil 10 using the first and second shaping dies 21 and 22 such that one of the flatwise bent portions f1 to f3 is bent in the direction that is opposite to the direction in which the rest are bent.

Figure 17A:
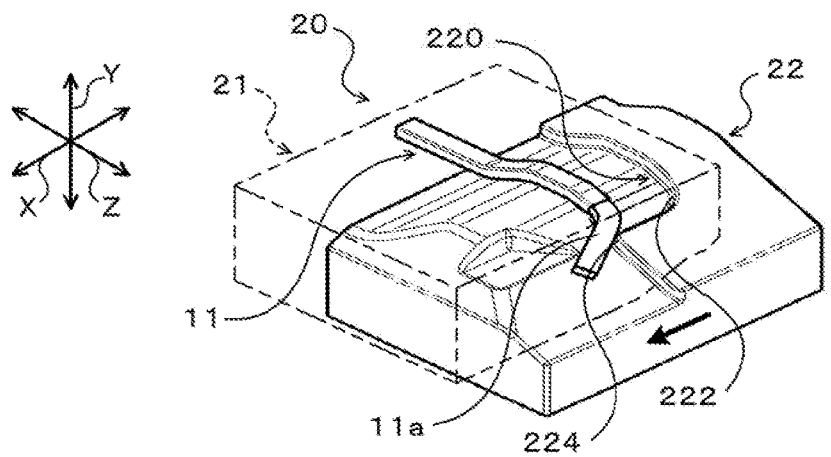
FIGS. 17A, 17B, and 17C are each a perspective view illustrating the procedure for shaping the lead wire portion using the coil end shaping apparatus according to a preferred embodiment.
Figure 17B:
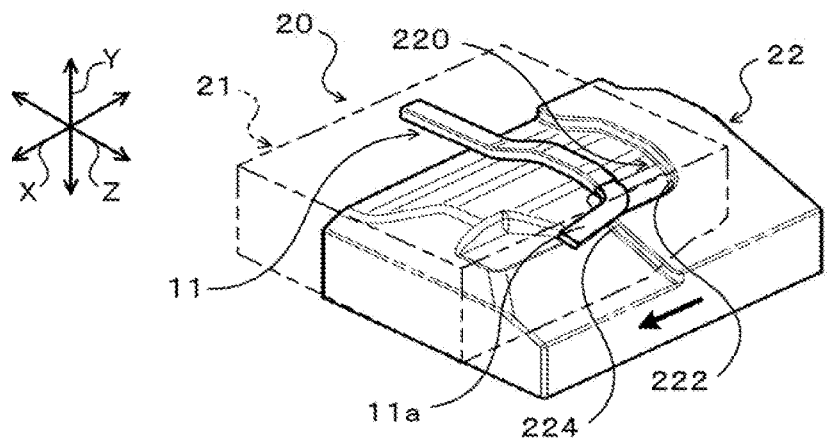
Figure 17C:
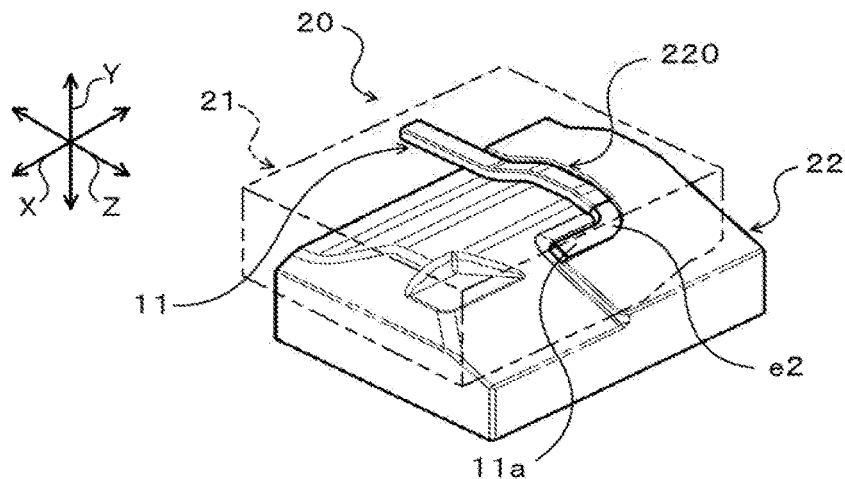

When the movable stage 202 and the second shaping die 22 are further moved toward the first shaping die 21 after the three flatwise bent portions f1 to f3 are shaped in the lead wire portion 11, a side surface of the lead wire portion 11 on the second shaping die 22 side, that is, a part of a side surface of the free end portion 11a in the embodiment, abuts against the pressing surface 224 of the second edgewise shaping surface 220 of the second shaping die 22. Consequently, as the second shaping die 22 is moved toward the first shaping die 21, a load for shaping the edgewise bent portion e2 is applied from the pressing surface 224 of the second edgewise shaping surface 220 of the second shaping die 22 to the free end portion 11a of the lead wire portion 11. As a result, as illustrated in FIGS. 17A and 17B, the free end portion 11a of the lead wire portion 11 is bent along the edgewise direction toward the pressure reception surface 213 of the first edgewise shaping surface 210 of the first shaping die 21. Finally, the free end portion 11a of the lead wire portion 11 is pressed against the curved surface 212 of the first edgewise shaping surface 210 of the first shaping die 21 by the curved surface 222 of the second edgewise shaping surface 220 of the second shaping die 22 to be plastically deformed, whereby the edgewise bent portion e2 on the side closest to the free end is shaped.

With the coil end shaping apparatus 20, in this way, the edgewise bent portion e2 on the side closest to the free end can be shaped in the lead wire portion 11, in addition to the three flatwise bent portions f1 to f3, by bringing the first and second shaping dies 21 and 22 close to each other. In the embodiment, in addition, the first and second shaping dies 21 and 22 are configured such that both the first and second shaping dies 21 and 22 do not abut against a portion of the lead wire portion 11 on the free end side with respect to a portion of the lead wire portion 11 to be bent along the edgewise direction on the side closest to the free end, that is, the free end portion 11a from which the coating has been removed, at least at the same time when the edgewise bent portion e2 is shaped. Consequently, it is possible to shape the edgewise bent portion e2 on the side closest to the free end without restraining the free end portion 11a of the lead wire portion 11. Thus, it is possible to suppress an increase in amount of elongation of the wire material at the edgewise bent portion e2, and to suppress an increase in dimensional error of the lead wire portion 11 and electric resistance at the edgewise bent portion e2.

As discussed above, the flatwise bent portions f1 to f3 and the edgewise bent portion e2 are shaped in the lead wire portion 11 by the first and second shaping dies 21 and 22 during a period since the start of movement of the movable stage 202 and the second shaping die 22 until the movable stage 202 and the second shaping die 22 are moved from the stand-by position by a distance determined in advance (until the gap between the first edgewise shaping surface 210 and the second edgewise shaping surface 220 generally coincides with the width of the lead wire portion 11). The movable stage 202 and the second shaping die 22 are stopped when the movable stage 202 and the second shaping die 22 are moved along the X direction from the stand-by position by a distance determined in advance, and held at the stop position. To hold the movable stage 202 and the second shaping die 22 at the stop position, a load (torque) in the X direction from the second shaping die 22 toward the first shaping die 21 may be applied to the movable stage 202 and the second shaping die 22, or the movable stage 202 and the second shaping die 22 may be mechanically held at the stop position by the action of a feed screw or the like.

After the movement of the movable stage 202 and the second shaping die 22 to approach the first shaping die 21 is stopped, the movable stage 202 is moved by the drive unit (not illustrated) to the stand-by position along the X direction such that the second shaping die 22 is moved away from the first shaping die 21. Next, as indicated by the broken line in FIG. 3, the drive unit (not illustrated) is actuated to turn the coil support portion 25 clockwise in FIG. 3 about the axis of the rotary shaft 25a. Consequently, the edgewise bent portion e1 on the side closest to the base end can be shaped by bending the lead wire portion 11 along the edgewise direction using the bend fulcrum portion (not illustrated) as the fulcrum through turning of the coil support portion 25 which supports the coil 10 with the free end side of the lead wire portion 11 held (restrained) by the first and second shaping dies 21 and 22. As a result, it is possible to shape the edgewise bent portion e1 on the side closest to the base end and to secure the precision in position of the free end portion 11a of the lead wire portion 11 with respect to the coil 10.

In the embodiment, shaping of the edgewise bent portion e1 on the side closest to the base end is completed by turning the coil support portion 25 by 90° clockwise from the initial position as indicated by the broken line in FIG. 3. After shaping of the plurality of edgewise bent portions e1 and e2 and the plurality of flatwise bent portions f1, f2, and f3 in the lead wire portion 11 is completed, the coil 10 is detached from the coil support portion 25.

As has been described above, the coil end shaping apparatus 20 includes the first and second shaping dies 21 and 22 which come close to and away from each other, and the three flatwise bent portions f1 to f3, one (f1) of which is bent in the direction that is opposite to the direction in which the rest (f2 and f3) are bent, are shaped in the lead wire portion 11 which extends from one end of the coil 10 by bringing the first and second shaping dies 21 and 22 close to each other to bend the lead wire portion 11 along a direction (Y direction, that is, the flatwise direction) that is different from the moving direction (X direction). In the coil end shaping apparatus 20, the second shaping die 22 has the clearance portion 230 which prevents a portion of the lead wire portion 11 to be bent along the flatwise direction on the side closest to the free end from being restrained by not contacting the lead wire portion 11 while the flatwise bent portions f1 and f2 on the base end side with respect to the flatwise bent portion f3 on the side closest to the free end, of the three flatwise bent portions f1 to f3, are shaped in the lead wire portion 11.

In this way, by providing the second shaping die 22 with the clearance portion 230 to prevent the portion of the lead wire portion 11 to be bent along the flatwise direction on the side closest to the free end from being restrained (plastically deformed) while the flatwise bent portions f1 and f2 on the base end side with respect to the flatwise bent portion f3 on the side closest to the free end are shaped (before plastic deformation is caused), it is possible to shape the flatwise bent portions f1 and f2 on the base end side of the lead wire portion 11 and to suppress an increase in amount of elongation of the wire material, and to additionally shape the flatwise bent portion f3 on the side closest to the free end. Consequently, it is possible to suppress an increase in dimensional error and electric resistance of the flatwise bent portions f1 to f3, and to improve the precision in position of the free end portion 11a of the lead wire portion 11 with respect to the coil 10. Thus, with the coil end shaping apparatus 20, it is possible to collectively and precisely shape the three flatwise bent portions f1 to f3 in the lead wire portion 11 which extends from one end of the coil 10 using the first and second shaping dies 21 and 22 such that one of the flatwise bent portions f1 to f3 is bent in the direction that is opposite to the direction in which the rest are bent.

In the coil end shaping apparatus 20, in addition, the first shaping die 21 has the flatwise shaping surface 215 which includes the plurality of curved surfaces 216, 217, and 218 corresponding to the three flatwise bent portions f1 to f3, and the clearance portion 230 of the second shaping die 22 is a recessed portion that opposes the curved surface 218, which corresponds to the flatwise bent portion f3 on the side closest to the free end, of the flatwise shaping surface 215 while the flatwise bent portions f1 and f2 on the base end side with respect to the flatwise bent portion f3 on the side closest to the free end are shaped in the lead wire portion 11. Consequently, it is possible to bring a portion of the lead wire portion 11 to be bent along the flatwise direction on the side closest to the free end and the second shaping die 22 out of contact with each other while the flatwise bent portions f1 and f2 on the base end side with respect to the flatwise bent portion f3 on the side closest to the free end are shaped by bringing the first and second shaping dies 21 and 22 close to each other This prevents the portion of the lead wire portion 11 to be bent along the flatwise direction on the side closest to the free end from being restrained by the first and second shaping dies 21 and 22.

In the coil end shaping apparatus 20, furthermore, the second shaping die 22 has the pressing surface 229 which extends in the Z direction, that is, in parallel with the lead wire portion 11 of the coil 10 which is supported by the coil support portion 25, and which is inclined so as to approach the flatwise shaping surface 215 of the first shaping die 21 as the first and second shaping dies 21 and 22 come close to each other. The clearance portion 230 which is a recessed portion is formed in the second shaping die 22 so as to open on the pressing surface 229 side, Consequently, it is possible to shape the flatwise bent portions f1 and f2 on the base end side with respect to the flatwise bent portion f3 on the side closest to the free end by pressing the lead wire portion 11 against the flatwise shaping surface 215 of the first shaping die 21 using the pressing surface 229 of the second shaping die 22 while preventing a portion of the lead wire portion 11 to be bent along the flatwise direction on the side closest to the free end from being restrained by the first and second shaping dies 21 and 22.

In the coil end shaping apparatus 20, in addition, the flatwise bent portions f1 to f3 are shaped by moving the second shaping die 22, which is a movable die, to approach the first shaping die 21, which is a fixed die, with the lead wire portion 11 supported by the pressure reception surface 211 of the first shaping die 21. Consequently, it is possible to collectively and precisely shape the three flatwise bent portions f1 to f3 in the lead wire portion 11 which extends from one end of the coil 10 using the first and second shaping dies 21 and 22 such that one of the flatwise bent portions f1 to f3 is bent in the direction that is opposite to the direction in which the rest are bent. It should be understood, however, that the first shaping die 21 may be configured as a movable die and the second shaping die 22 may be configured as a fixed die in the coil end shaping apparatus 20.

In the coil end shaping apparatus 20, furthermore, the first and second shaping dies 21 and 22 are configured to shape the edgewise bent portion e2 on the side closest to the free end which is bent along the edgewise direction by bringing close to each other. Consequently, it is possible to shape the three flatwise bent portions f1 to f3 and the one edgewise bent portion e2 in the lead wire portion 11 in a short time by bringing the first and second shaping dies 21 and 22 close to each other. The first and second shaping dies 21 and 22 may be configured to shape a plurality of edgewise bent portions that are bent along the edgewise direction by bringing close to each other. In addition, the edgewise shaping surface may be omitted from one of the first and second shaping dies 21 and 22 and the coil end shaping apparatus 20 may be provided with a third shaping die that comes close to and away from the other of the first and second shaping dies 21 and 22 to shape at least one edgewise bent portion in the lead wire portion 11 using the third shaping die and the other of the first and second shaping dies 21 and 22. In this case, the third shaping die and the coil support portion 25 may be configured to shape the edgewise bent portion e1 by clockwise turning in FIG. 3 in conjunction with the movement of the third shaping die toward the other of the first and second shaping dies 21 and 22.

In the coil end shaping apparatus 20, in addition, the first and second shaping dies 21 and 22 are configured not to restrain a portion of the lead wire portion 11 on the free end side with respect to the flatwise bent portion f3 on the side closest to the free end (at least the free end portion 11a from which the coating has been removed). Consequently, it is possible to suppress fluctuations in amount of elongation of the wire material among the three flatwise bent portions f1 to f3, and to suppress an increase in amount of elongation of the wire material at the edgewise bent portion e2. In the case where the coating on the free end portion 11a of the lead wire portion 11 is not removed prior to the shaping of the flatwise bent portions f1 to f3 and the edgewise bent portions e1 and e2, the first and second shaping dies 21 and 22 may be configured not to restrain the portion of the lead wire portion 11 on the free end side with respect to the flatwise bent portion f3 on the side closest to the free end in consideration of the thickness of the coating.

In the coil end shaping apparatus 20, furthermore, the first and second shaping dies 21 and 22 are configured to shape the three flatwise bent portions f1 to f3 in the lead wire portion 11 such that the flatwise bent portion f1 on the side closest to the base end is bent in the direction that is opposite to the direction in which the remaining flatwise bent portions f2 and f3 are bent. However, the present invention is not limited thereto. That is, the flatwise bent portion f2 or f3 may be bent in the direction that is opposite to the direction in which the rest are bent, and the first and second shaping dies 21 and 22 may be configured to shape two or more flatwise bent portions in the lead wire portion 11 by bringing close to each other so that at least one of the flatwise bent portions is bent in the direction that is opposite to the direction in which the rest are bent.

In addition, the lead wire portion 11 which is to be shaped by the coil end shaping apparatus 20 is not limited to those with a rectangular (oblong) cross section, and may have a square, circular, or elliptical cross section. In such a case, the first bend direction corresponding to the flatwise direction is a direction that is orthogonal to one side of the (square) cross section, one diameter, or the minor axis of the conductor, and the second bend direction corresponding to the edgewise direction is a direction that is orthogonal to another side that is orthogonal to the one side of the (square) cross section, another diameter that is orthogonal to the one diameter, or the major axis of the conductor.

The moving direction of the first and second shaping dies 21 and 22 of the coil end shaping apparatus 20 is not limited to the X direction which is orthogonal to both the Y direction (first bend direction) and the Z direction (the extension direction of the lead wire portion 11 of the coil 10 supported by the coil support portion 25 before being bent). That is, the moving direction may be any direction such as a direction that is inclined with respect to the X direction as long as the direction is parallel to a plane (XZ plane) formed by an axis that extends in the X direction and an axis that extends in the Z direction. In addition, the first bend direction is not limited to the Y direction which is orthogonal to both the X direction (moving direction) and the Z direction (the extension direction of the lead wire portion 11 of the coil 10 before being bent), That is, the first bend direction may be any direction such as a direction that is inclined with respect to the Y direction as long as that the direction intersects the XZ plane.

While an embodiment of the present invention has been described above, it is a matter of course that the present invention is not limited to the embodiment described above in any way, and that the present invention may be modified in various ways without departing from the range of the extension of the present invention. In addition, the mode for carrying out the present invention described above is merely a specific form of the invention described in the "SUMMARY OF THE INVENTION" section, and does not limit the elements of the invention described in the "Means for Solving the Problem" section.

The invention claimed is:

1. A coil end shaping apparatus configured to shape at least two first bent portions that are bent along a first bend direction in a lead wire portion extending from one end of a coil, comprising:
   first and second shaping dies that come close to and away from each other and that shape the at least two first bent portions by bringing close to each other to bend the lead wire portion in a direction that is different from a moving direction, wherein:
      at least one of the at least two first bent portions is bent in a direction that is opposite to a direction in which the first bent portion other than the at least one first bent portion is bent;
      one of the first and second shaping dies is configured with a clearance portion that prevents a portion of the lead wire portion to be bent along the first bend direction on a side closest to a free end from being restrained by not contacting the lead wire portion while the first bent portion on a base end side with respect to one of the at least two first bent portions on the side closest to the free end is shaped in the lead wire portion by the first and second shaping dies;
      an other of the first and second shaping dies that is not configured with the clearance portion has a first shaping surface that includes a plurality of curved surfaces corresponding to the at least two first bent portions; and
      the clearance portion is a recessed portion formed in the one of the first and second shaping dies so as to oppose one of the curved surfaces of the first shaping surface corresponding to the one of the at least two first bent portions on the side closest to the free end while the first bent portion on the base end side with respect to the first bent portion on the side closest to the free end is shaped in the lead wire portion by the first and second shaping dies.

2. The coil end shaping apparatus according to claim 1, wherein:
   the one of the first and second shaping dies has a pressing surface that extends in parallel with the lead wire portion and that is inclined so as to approach the first shaping surface as the first and second shaping dies are moved toward each other; and
   the recessed portion is formed so as to open on the pressing surface side.

3. The coil end shaping apparatus according to claim 2, wherein:
   the one of the first and second shaping dies is a movable die that comes close to and away from the other, and the other of the first and second shaping dies is a fixed die.

4. The coil end shaping apparatus according to claim 2, wherein:
   the first and second shaping dies are configured not to restrain a portion of the lead wire portion on a free end side with respect to the first bent portion on the side closest to the free end.

5. The coil end shaping apparatus according to claim 2, wherein:
   the first and second shaping dies are configured to shape at least one second bent portion that is bent along a second bend direction that is orthogonal to the first bend direction by bringing close to each other.

6. The coil end shaping apparatus according to claim 2, wherein:
   the first and second shaping dies are configured to bend the lead wire portion along a direction that is orthogonal to the moving direction.

7. The coil end shaping apparatus according to claim 1, wherein:
   the first and second shaping dies are configured not to restrain a portion of the lead wire portion on a free end side with respect to the first bent portion on the side closest to the free end.

8. The coil end shaping apparatus according to claim 1, wherein:
   the first and second shaping dies are configured to shape at least one second bent portion that is bent along a second bend direction that is orthogonal to the first bend direction by bringing close to each other.

9. The coil end shaping apparatus according to claim 1, wherein:
   the first and second shaping dies are configured to bend the lead wire portion along a direction that is orthogonal to the moving direction.

* * * * *